(No Model.)
F. C. SMALSTIG.
CAN OPENER.
No. 538,934. Patented May 7, 1895.
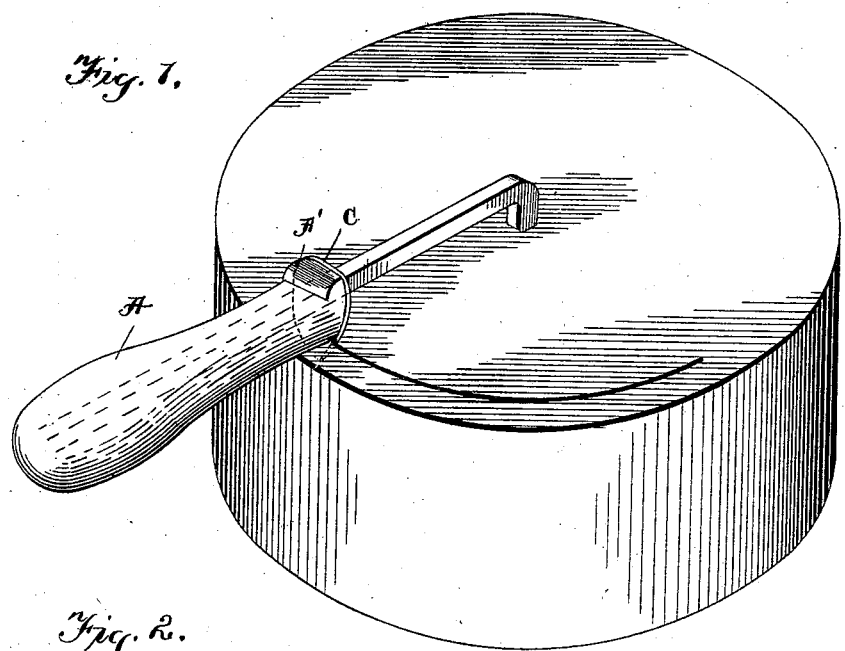
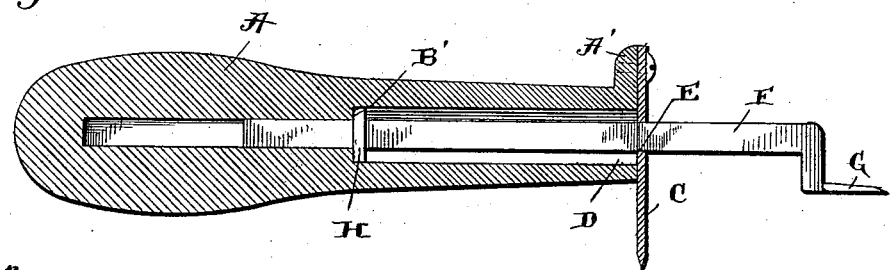
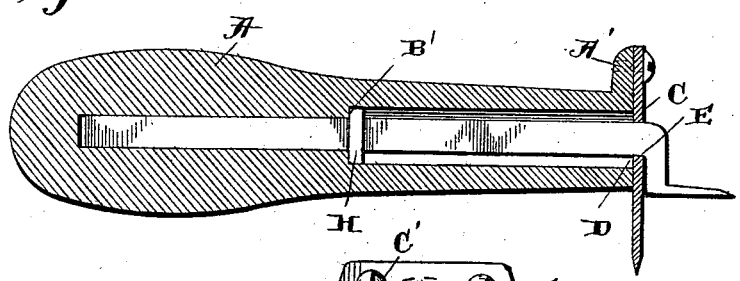
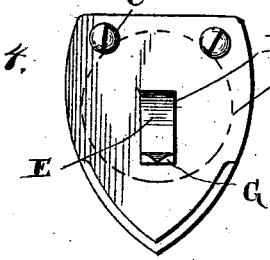
Witnesses:
Geo. E. Frech.
James O. Berand
Inventor.
F. C. Smalstig.
By Pattison & Nesbit
Attorneys.
THE NORRIS PETERS CO., PHOTO-LITHO., WASHINGTON, D. C.

UNITED STATES PATENT OFFICE.

FREDERICK C. SMALSTIG, OF ALLEGHENY, PENNSYLVANIA.

CAN-OPENER.

SPECIFICATION forming part of Letters Patent No. 538,934, dated May 7, 1895.

Application filed February 13, 1895. Serial No. 538,257. (No model.)

*To all whom it may concern:*

Be it known that I, FREDERICK C. SMALSTIG, of Allegheny, in the county of Allegheny and State of Pennsylvania, have invented certain new and useful Improvements in Can-Openers; and I do hereby declare the following to be a full, clear, and exact description of the invention, such as will enable others skilled in the art to which it pertains to make and use it, reference being had to the accompanying drawings, which form part of this specification.

My invention relates to an improved can opener; and the object of the same is to provide an implement of improved adjustment for cutting openings of any desired diameter within the capacity of the implement.

The invention consists in the novel features of construction hereinafter fully described and claimed, and illustrated in the accompanying drawings, in which—

Figure 1 is a perspective view of the implement in use on a can. Fig. 2 is a longitudinal sectional view of the same. Fig. 3 is a similar view showing the implement adjusted differently than in Fig. 1. Fig. 4 is an end view.

A designates the handle recessed longitudinally from one end with the recess reduced in size to form the shoulder B'.

C is the cutter having the double edges as shown and secured transversely to the end of handle A by means of screws C' entering lug A' on the handle, thus closing the depression D. The body of the cutter is provided with opening E in line with the center of cavity B and extended inward through this opening is the stem or spindle F having the hooked and sharpened end G. Within the larger part of cavity D there is mounted upon said stem the frictional ring H which may be adjusted to any position desired on the stem, and which is adapted to bear against shoulder B' for the purpose of holding the cutter a fixed distance from the hooked outer end of the stem or spindle. In operation the said hooked end is adapted to engage the center of the lid with the said frictional ring so adjusted on the stem as to hold the knife at the proper radius and then the opening is formed by simply rotating the cutter around the can head in the usual manner as will be readily understood.

A can opener constructed as herein shown and described is very simple in construction and is adapted for cans of all sizes, while at the same time it is very compact as when not in use it is adapted to be pushed back into the handle as shown in Fig. 2 with the point end of the stem quite close to the cutter.

Having thus fully described my invention, what I claim as new, and desire to secure by Letters Patent, is—

1. A can opener comprising handle A recessed inward from one end, the inner portion of the recess being of less diameter than the outer portion to form a shoulder, the said inner portion of the recess being of the same dimensions as the turning stem to positively guide the latter, the turning stem extended into the recess, the frictional ring carried by the stem and bearing against the shoulder before mentioned, and a cutter, substantially as shown and described.

2. A can opener comprising a recessed handle, the turning stem extended thereinto, and adjustable longitudinally, and the cutter C secured to the handle end to close the same and formed with an opening through which the stem extends, substantially as shown and described.

3. An improved can opener comprising the longitudinally recessed handle, the shoulder formed in said recess, the cutter secured transversely across the open end of the handle and provided with an opening, the hooked stem extended inward through said cutter opening and into the depression in the handle, and a frictional ring carried by the stem for engaging the said shoulder in the manner shown and described.

In testimony whereof I affix my signature in presence of two witnesses.

FREDERICK C. SMALSTIG.

Witnesses:
W. F. WESTERSHAUSEN,
EUGENE P. ZITTERBART.